United States Patent
Zheng et al.

(10) Patent No.: US 11,723,129 B2
(45) Date of Patent: Aug. 8, 2023

(54) VOLTAGE-REGULATING PHASE-CUT DIMMABLE POWER SUPPLY

(71) Applicant: Zhuhai Shengchang Electronics Co., Ltd., Zhuhai (CN)

(72) Inventors: Dehua Zheng, Zhuhai (CN); Xianyun Zhao, Zhuhai (CN)

(73) Assignee: Zhuhai Shengchang Electronics Co., Ltd., Zhuhai (CN)

( * ) Notice: Subject to any disclaimer, the term of this patent is extended or adjusted under 35 U.S.C. 154(b) by 37 days.

(21) Appl. No.: 17/347,983

(22) Filed: Jun. 15, 2021

(65) Prior Publication Data

US 2021/0392729 A1 Dec. 16, 2021

(30) Foreign Application Priority Data

Jun. 15, 2020 (CN) .......................... 202021103769.3

(51) Int. Cl.
*H05B 45/325* (2020.01)
*H02M 1/44* (2007.01)
(Continued)

(52) U.S. Cl.
CPC ............ *H05B 45/325* (2020.01); *H02M 1/44* (2013.01); *H05B 45/10* (2020.01); *H05B 45/355* (2020.01)

(58) Field of Classification Search
CPC .. H04B 45/10; H04B 45/385; H04B 45/3725; H04B 45/375; H04B 45/38;
(Continued)

(56) References Cited

U.S. PATENT DOCUMENTS 7,719,246 B2 * 5/2010 Melanson ........... H02M 1/4225
323/283
7,852,017 B1 * 12/2010 Melanson .............. H05B 45/38
315/307
(Continued)

FOREIGN PATENT DOCUMENTS

| EP | 2903396 A1 * | 8/2015 | ........... H01L 25/167 |
| WO | WO-2013110039 A1 * | 7/2013 | ........... H01L 25/167 |
| WO | WO-2016193028 A1 * | 12/2016 | .............. H02M 1/32 |

*Primary Examiner* — Monica C King
(74) *Attorney, Agent, or Firm* — Bayramoglu Law Offices, LLC

(57) ABSTRACT

A voltage-regulating phase-cut dimmable power supply includes an electromagnetic interference filter circuit, a rectifier circuit, a power conversion circuit, a transformer, a rectifier and filter circuit, a phase-cut dimming signal conversion circuit, a first optocoupler, a dimming signal conversion circuit, a voltage comparison control circuit, a second optocoupler, a pulse width modulation (PWM) control circuit, and a voltage sampling circuit. The electromagnetic interference filter circuit, the rectifier circuit, the power conversion circuit, the transformer and the rectifier and filter circuit are electrically connected in sequence. The phase-cut dimming signal conversion circuit, the first optocoupler, the dimming signal conversion circuit, the voltage comparison control circuit, the second optocoupler and the PWM control circuit are electrically connected in sequence to an output end of the electromagnetic interference filter circuit. The voltage sampling circuit is electrically connected to the voltage comparison control circuit and an output end of the rectifier and filter circuit.

2 Claims, 1 Drawing Sheet

(51) Int. Cl.
*H05B 45/355* (2020.01)
*H05B 45/10* (2020.01)

(58) Field of Classification Search
CPC ...... H04B 45/382; H04B 45/39; H04B 45/37; H04B 45/395; H04B 45/355; H04B 45/14; H04B 47/19; H04B 45/50; H04B 45/31; H04B 41/3924; H04B 45/44; H04B 45/20; H04B 47/10; H04B 45/46; H04B 45/3575; H04B 45/48; H04B 45/00; H04B 47/11; H04B 45/325; H04B 45/18; H04B 39/044; H04B 41/3921; H04B 44/00; H04B 39/048; H04B 47/24; H04B 45/12; H04B 45/56; H04B 47/16; H04B 47/18; H04B 41/2828; H04B 47/115; H04B 47/185; H04B 47/155; H04B 45/36; H04B 45/58; H04B 41/282; H04B 41/3927; H04B 45/397; H04B 47/20; H04B 39/08; H04B 45/22; H04B 45/335; H04B 47/175; H04B 39/04; H04B 41/2985; H04B 45/3578; H04B 45/327; H04B 41/36; H04B 45/3574; H04B 45/59; H04B 47/195; H04B 41/295; H04B 41/28; H04B 41/3925; H04B 47/105; H04B 41/14; H04B 45/315; H04B 45/34; H04B 41/2827; H04B 45/60; H04B 47/13; H04B 39/045; H04B 41/2806; H04B 45/24; H04B 45/32; H04B 45/40; H04B 39/041; H04B 39/086; H04B 39/088; H04B 41/2855; H04B 41/2856; H04B 41/38; H04B 45/3577; H04B 47/12; H04B 47/125; H04B 47/165; H04B 47/26; H04B 45/345; H04B 45/35; H04B 41/2983; H04B 45/28; H04B 45/30; H04B 45/357; H04B 45/42; H04B 47/17; H04B 47/25; H04B 39/06; H04B 41/24; H04B 41/2886; H04B 41/2981; H04B 41/2986; H04B 41/384; H04B 41/39; H04B 47/135; H04B 41/2853; H04B 41/288; H04B 41/2883; H04B 41/2885; H04B 41/2925; H04B 41/46; H04B 45/305; H04B 45/347; H04B 45/54; H04B 47/00; H04B 47/14; H04B 47/28; H04B 1/0263; H04B 3/0033; H04B 39/02; H04B 41/042; H04B 41/26; H04B 41/2825; H04B 41/2851; H04B 41/2888; H04B 41/2923; H04B 41/2988; H04B 41/382; H04B 41/392; H04B 41/3928; H04B 47/22; H04B 6/6408; H04B 6/6435; H04B 6/645; H04B 6/6494; H04B 6/687; H02M 5/293; H02M 1/0009; H02M 3/33507; H02M 3/33523; H02M 1/08; H02M 3/33553; H02M 1/0006; H02M 1/32; H02M 1/4225; H02M 1/4258; H02M 3/156; H02M 7/06; H02M 3/158; H02M 1/4208; H02M 1/0012; H02M 1/009; H02M 1/0058; H02M 3/33571; H02M 1/088; H02M 1/007; H02M 3/01; H02M 3/33538; H02M 3/335; H02M 3/33561; H02M 1/081; H02M 3/33546; H02M 7/217; H02M 3/33515; H02M 1/42; H02M 1/44; H02M 5/2935; H02M 1/0003; H02M 3/3376; H02M 7/4815; H02M 1/14; H02M 1/327; H02M 5/257; H02M 5/2573; H02M 1/083; H02M 7/219; H02M 1/0022; H02M 3/1584; H02M 1/0025; H02M 1/143; H02M 1/15; H02M 1/4266; H02M 3/1582; H02M 5/2576; H02M 3/07; H02M 3/33592; H02M 1/0064; H02M 1/36; H02M 3/285; H02M 3/015; H02M 3/1586; H02M 1/0048; H02M 3/003; H02M 3/1588; H02M 5/458; H02M 1/0032; H02M 1/123; H02M 1/348; H02M 3/33569; H02M 3/33576; H02M 1/0054; H02M 1/12; H02M 1/126; H02M 1/4216; H02M 1/4233; H02M 3/1555; H02M 3/24; H02M 3/33584; H02M 3/337; H02M 3/3382; H02M 5/273; H02M 7/05; H02M 7/103; H02M 7/48; H02M 7/487; H02M 7/537; H02M 7/53875; H02M 7/797; H02M 1/34; H02M 1/342; H02M 3/155; H02M 3/157; H02M 3/28; H02M 3/33573; H02M 3/3378; H02M 5/225; H02M 7/2195; H02M 7/493; H02M 7/77; H02M 1/00; H02M 1/0029; H02M 1/0035; H02M 1/0038; H02M 1/0045; H02M 1/0074; H02M 1/0077; H02M 1/008; H02M 1/40; H02M 1/4241; H02M 3/005; H02M 3/3374; H02M 5/04; H02M 5/22; H02M 5/2932; H02M 7/062; H02M 7/21; H02M 7/2173; H02M 7/2176; H02M 7/4818; H02M 7/4833; H02M 7/53803; H02M 7/53832; H02M 7/5387; H02M 7/53873

See application file for complete search history.

(56) References Cited

U.S. PATENT DOCUMENTS

| | | | | |
|---|---|---|---|---|
| 8,482,223 B2* | 7/2013 | Draper | ................ | H05B 47/185 |
| | | | | 315/297 |
| 9,774,245 B1* | 9/2017 | Huang | ................ | H02M 1/4225 |
| 2014/0361701 A1* | 12/2014 | Siessegger | ............ | H01L 27/156 |
| | | | | 315/307 |

* cited by examiner

VOLTAGE-REGULATING PHASE-CUT DIMMABLE POWER SUPPLY

CROSS REFERENCE TO THE RELATED APPLICATIONS

This application is based upon and claims priority to Chinese Patent Application No. 202021103769.3, filed on Jun. 15, 2020, the entire contents of which are incorporated herein by reference.

TECHNICAL FIELD

The present invention relates to the field of phase-cut dimmable power supplies, and more particularly, to a voltage-regulating phase-cut dimmable power supply.

BACKGROUND

Most existing phase-cut dimmable power supplies transmit pulse width modulation (PWM) output. The PWM output, however, has the following disadvantages. There might be problems of flickering and noise when the dimming frequency is within 3.2 KHz, and noise occurs as well when the dimming frequency is between 3.2 KHz and 20 KHz. The dimming frequency above 20 KHz is hardly available at present because of great loss and difficult protection and dimming. In addition, there exists a novel light-emitting diode (LED) lamp of which the brightness and color temperature can be simultaneous changed. The simultaneous changes in brightness and color temperature of such LED lamp can be achieved only by regulating the voltage, which would not be realized by using a power supply with PWM output. There are also some commercially available dimmable power supplies using a silicon-controlled rectifier (SCR) which are allowable for dimming by power regulation, but such SCR dimmable power supplies have the disadvantages of high ripple voltage, flickering, low efficiency, limitations on load power and others.

SUMMARY

The present invention is aimed to solve at least one of the technical problems in the prior art. In view of this, the present invention provides a SCR dimmable power supply which is allowable for regulating the output voltage and is flicker-free with low ripple and no limitation on load power.

In order to solve the technical problems, an embodiment of the present invention adopts the following technical solutions. A voltage-regulating phase-cut dimmable power supply includes a phase-cut dimmer connected to an external power supply, and a voltage-regulating phase-cut dimmable power supply connected to an output end of the phase-cut dimmer. The voltage-regulating phase-cut dimmable power supply may be connected to a luminaire. The voltage-regulating phase-cut dimmable power supply includes an electromagnetic interference filter circuit, a rectifier circuit, a power conversion circuit, a transformer and a rectifier and filter circuit which are electrically connected in sequence. The voltage-regulating phase-cut dimmable power supply further includes a phase-cut dimming signal conversion circuit, a first optocoupler, a dimming signal conversion circuit, a voltage comparison control circuit, a second optocoupler and a PWM control circuit which are electrically connected in sequence to an output end of the electromagnetic interference filter circuit. An output end of the PWM control circuit is electrically connected to the power conversion circuit. The voltage-regulating phase-cut dimmable power supply further includes a voltage sampling circuit that is electrically connected to an output end of the rectifier and filter circuit and the voltage comparison control circuit, respectively. An input end of the electromagnetic interference filter circuit is electrically connected to the output end of the phase-cut dimmer. The output end of the rectifier and filter circuit may be electrically connected to the luminaire.

The voltage-regulating phase-cut dimmable power supply may further include a power factor correction (PFC) control circuit and a PFC circuit. The PFC circuit is electrically connected to the PFC control circuit, an output end of the rectifier circuit and an input end of the power conversion circuit, respectively.

The present invention has the following advantages. A voltage-regulating phase-cut dimmable power supply includes an electromagnetic interference filter circuit, a rectifier circuit, a power conversion circuit, a transformer and a rectifier and filter circuit which are electrically connected in sequence. The voltage-regulating phase-cut dimmable power supply further includes a phase-cut dimming signal conversion circuit, a first optocoupler, a dimming signal conversion circuit, a voltage comparison control circuit, a second optocoupler and a PWM control circuit which are electrically connected in sequence to an output end of the electromagnetic interference filter circuit. An output end of the PWM control circuit is electrically connected to the power conversion circuit. The voltage-regulating phase-cut dimmable power supply further includes a voltage sampling circuit that is electrically connected to an output end of the rectifier and filter circuit and the voltage comparison control circuit, respectively. An input end of the electromagnetic interference filter circuit is electrically connected to the output end of the phase-cut dimmer. The output end of the rectifier and filter circuit may be electrically connected to the luminaire. The voltage-regulating phase-cut dimmable power supply is flicker-free with low noise and low ripple and no limitation on load power by regulating the output voltage, and can be matched with a novel LED lamp to simultaneously regulate the brightness and color temperature thereof.

BRIEF DESCRIPTION OF THE DRAWINGS

The above and/or additional aspects and advantages of the present invention will become apparent and readily comprehensible from the description of embodiments with reference to the following drawings.

DETAILED DESCRIPTION OF THE EMBODIMENTS

Figure 1:
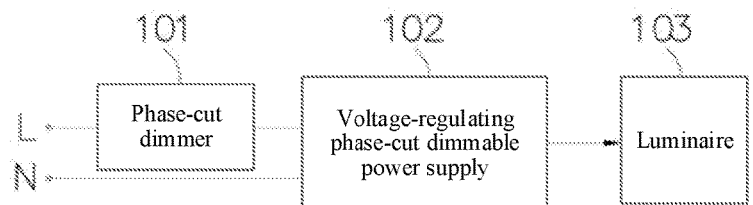
FIG. 1 is an illustration of an application scenario of the present invention.

Specific embodiments of the present invention will be described in detail below. Preferred embodiments of the present invention are illustrated in the drawings. The drawings serve to supplement the text description herein with figures, providing a visual understanding of each technical feature and the overall technical solution of the present invention, but cannot be construed as a limitation to the scope of protection of the present invention.

In the description of the present invention, "a plurality of" means two or more; and the terms such as "greater/larger than", "less/smaller than", and "exceed" are construed as exclusive of the numerical value stated, and the terms such as "above", "below", and "within" are construed as inclusive of the numerical value stated. Moreover, the terms such as "first" and "second" are used only for the purpose of distinguishing between technical features and cannot be construed as indicating or implying relative importance or implicitly indicating the number of technical features indicated or implicitly indicating the precedence relationship of technical features indicated.

In the description of the present invention, it should be understood that orientations or position relationships indicated by terms "upper", "lower", "front", "rear", "left", "right" and others are based on the orientation or position relationships as shown in the drawings, and these terms are just used to facilitate description of the present invention and simplify the description, but not to indicate or imply that the mentioned device or component must have a specific orientation or must be constructed and operated in a specific orientation, and thus cannot be construed as a limitation to the present invention.

In the description of the present invention, it should be noted that, unless otherwise clearly specified and limited, meanings of terms "dispose", "install", "connect" and others should be construed in a broad sense. For example, the "connection" may be a fixed connection, a removable connection, or an integral connection; it may be a mechanical connection or an electrical connection; it may be a direct connection or an indirect connection through an intermediate medium; or it may be intercommunication between two components. Those skilled in the art may reasonably understand the specific meanings of such terms in the present invention based on the specific content of the technical solution.

Figure 2:
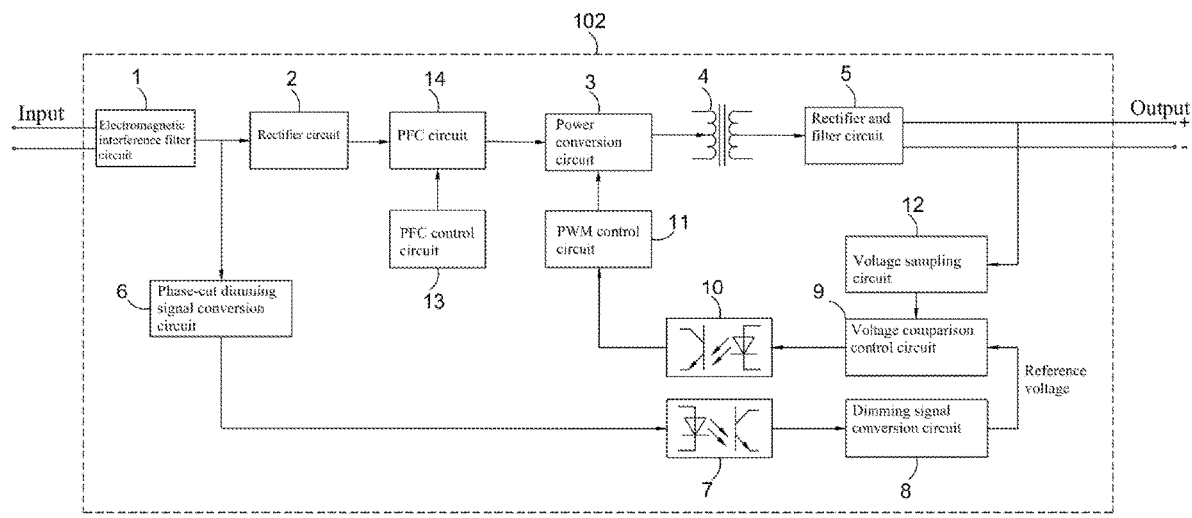
FIG. 2 is a schematic diagram of the structure of the present invention.

Referring to FIGS. 1 and 2, a voltage-regulating phase-cut dimmable power supply includes the phase-cut dimmer 101 connected to an external power supply, and the voltage-regulating phase-cut dimmable power supply 102 connected to an output end of the phase-cut dimmer 101. The voltage-regulating phase-cut dimmable power supply 102 may be connected to the luminaire 103. The voltage-regulating phase-cut dimmable power supply 102 includes the electromagnetic interference filter circuit 1, the rectifier circuit 2, the power conversion circuit 3, the transformer 4, and the rectifier and filter circuit 5 which are electrically connected in sequence. The voltage-regulating phase-cut dimmable power supply 102 further includes the phase-cut dimming signal conversion circuit 6, the first optocoupler 7, the dimming signal conversion circuit 8, the voltage comparison control circuit 9, the second optocoupler 10, and the PWM control circuit 11 which are electrically connected in sequence to an output end of the electromagnetic interference filter circuit 1. The output end of the PWM control circuit 11 is electrically connected to the power conversion circuit 3. The voltage-regulating phase-cut dimmable power supply 102 further includes the voltage sampling circuit 12 that is electrically connected to an output end of the rectifier and filter circuit 5 and the voltage comparison control circuit 9, respectively. An input end of the electromagnetic interference filter circuit 1 is electrically connected to the output end of the phase-cut dimmer 101. The output end of the rectifier and filter circuit 5 may be electrically connected to the luminaire 103.

The voltage-regulating phase-cut dimmable power supply may further include the PFC control circuit 13 and the PFC circuit 14. The PFC circuit 14 is electrically connected to the PFC control circuit 13, an output end of the rectifier circuit 2, and an input end of the power conversion circuit 3, respectively.

As shown in FIG. 1, the input end of the voltage-regulating phase-cut dimmable power supply 102 of the present invention is connected to the phase-cut dimmer 101, while the output end of the voltage-regulating phase-cut dimmable power supply 102 is connected to the luminaire 103. The phase-cut dimmer 101 is regulated to cause the output voltage of the voltage-regulating phase-cut dimmable power supply 102 and the brightness of the luminaire 103 to change accordingly. If the luminaire 103 is the novel LED lamp, the brightness and the color temperature thereof change simultaneously accordingly.

As shown in FIG. 2, the voltage-regulating phase-cut dimmable power supply 102 of the present invention receives a phase-cut alternating current (AC) from the phase-cut dimmer 101, and inputs the phase-cut AC to the electromagnetic interference filter circuit 1 for filtering out electromagnetic interference, then to the rectifier circuit 2 for rectification and to the PFC circuit 14 for power factor correction and voltage rising, so as to form direct current (DC) for supplying power to the power conversion circuit 3. The PFC control circuit 13 controls the PFC circuit 14 to stably output the DC to the power conversion circuit 3. The power conversion circuit 3 and the transformer 4 convert the DC into a desired voltage, and the desired voltage is rectified and filtered by the rectifier and filter circuit 5 into a desired stable DC voltage to be output to the luminaire 103. The PWM control circuit 11 controls the power conversion circuit 3 to operate stably. On the other hand, the AC filtered by the electromagnetic interference filter circuit 1 is input to the phase-cut dimming signal conversion circuit 6. The phase-cut dimming signal conversion circuit 6 converts a phase-cut AC signal into a PWM signal, and the PWM signal is transferred to the dimming signal conversion circuit 8 through the first optocoupler 7. The dimming signal conversion circuit 8 further converts the PWM signal into a reference voltage, and the reference voltage is input to the voltage comparison control circuit 9. Meanwhile, the voltage sampling circuit 12 samples a voltage signal of the output end of the voltage-regulating phase-cut dimmable power supply 102, decreases the voltage thereof and then inputs the voltage signal to the voltage comparison control circuit 9 for comparison with the reference voltage signal output by the dimming signal conversion circuit 8. When the voltage comparison control circuit 9 identifies the two signals as differing by comparison, the voltage comparison control circuit 9 outputs a control signal to the second optocoupler 10. The second optocoupler 10 transfers the control signal to the PWM control circuit 11, and then the PWM control circuit 11 regulates the outputs of the power conversion circuit 3 and the transformer 4 to achieve stable output.

After the phase-cut dimmer 101 is regulated to cause the conduction phase width of the AC to change, the conduction phase width of the AC input to the phase-cut dimming signal conversion circuit 6 changes accordingly. At this time, the pulse width of the PWM signal converted and output by the phase-cut dimming signal conversion circuit 6 also changes accordingly, and the PWM signal with a changed pulse width is transferred to the dimming signal conversion circuit 8 through the first optocoupler 7. Therefore, the reference voltage output by the dimming signal conversion circuit 8 also changes and is input to the voltage comparison control circuit 9, and at this time, the voltage comparison control circuit 9 sends a regulating signal to the PWM control circuit 11 via the second optocoupler 10. Furthermore, the PWM control circuit 11 causes a change in the outputs of the power conversion circuit 3 and the transformer 4 and further a change in the output voltage of the rectifier and filter circuit 5, thereby regulating the brightness and the color temperature of the luminaire 103. In normal conditions, when the phase-cut dimmer 101 is regulated to decrease in the conduction phase width of the AC, the output voltage of the voltage-regulating phase-cut dimmable power supply 102 is decreased. On the contrary, when the conduction phase width of the AC is increased, the output voltage of the voltage-regulating phase-cut dimmable power supply 102 is increased. The voltage-regulating phase-cut dimmable power supply is flicker-free with low noise and low ripple and no limitation on load power by regulating the output voltage, and can be matched with a novel LED lamp to simultaneously regulate the brightness and color temperature thereof.

In the present invention, the same effect can be achieved without using the PFC circuit 14 and the PFC control circuit 13, although a low power factor is generated for such embodiments. The embodiments without using the PFC circuit 14 and the PFC control circuit 13 shall also be deemed as falling within the scope of protection of the present invention.

Certainly, the present invention is not limited to the above embodiments. Equivalent transformations and replacements may be made by those skilled in the art without departing from the spirit of the present invention, and these transformations and replacements shall fall within the scope defined by the claims of the present invention.

What is claimed is:

1. A voltage-regulating phase-cut dimmable power supply, comprising:
    an electromagnetic interference filter circuit,
    a rectifier circuit,
    a power conversion circuit,
    a transformer,
    a rectifier and filter circuit,
    a phase-cut dimming signal conversion circuit,
    a first optocoupler,
    a dimming signal conversion circuit,
    a voltage comparison control circuit,
    a second optocoupler,
    a pulse width modulation (PWM) control circuit, and
    a voltage sampling circuit;
    an input end of the electromagnetic interference filter circuit is electrically connected to an output end of a phase-cut dimmer;
    wherein the electromagnetic interference filter circuit is electrically connected to the rectifier circuit and the power conversion circuit, respectively;
    the rectifier circuit is electrically connected to the power conversion unit and the transformer, respectively;
    the power conversion unit is electrically connected to the transformer and the rectifier and filter circuit, respectively;
    an output end of the electromagnetic interference filter circuit is electrically connected to the rectifier circuit and the phase-cut dimming signal conversion circuit;
    the phase-cut dimming signal conversion circuit is electrically connected to the first optocoupler and the dimming signal conversion circuit, respectively;
    the first optocoupler is electrically connected to the dimming signal conversion circuit and the voltage comparison control circuit, respectively;
    the dimming signal conversion circuit is electrically connected to the voltage comparison control circuit and the second optocoupler, respectively;
    the voltage comparison control circuit is electrically connected to the second optocoupler and the PWM control circuit, respectively;
    the second optocoupler is electrically connected to the PWM control circuit and the power conversion circuit, respectively;
    an output end of the PWM control circuit is electrically connected to the power conversion circuit;
    the voltage sampling circuit is electrically connected to an input end of the voltage comparison control circuit and an output end of the rectifier and filter circuit, respectively;
    the output end of the rectifier and filter circuit is electrically connected to the luminaire,
    wherein the electromagnetic interference filter circuit is configured to filter a phase-cut signal to produce a first phase-cut alternating current and a second phase-cut alternating current;
    the power conversion circuit is configured to convert the first phase-cut alternating current into an output voltage;
    the phase-cut dimming signal conversion circuit is configured to convert the second phase-cut alternating current into a PWM signal;
    the dimming signal conversion circuit is configured to convert the PWM signal into a reference voltage;
    the voltage sampling circuit is configured to sample the output voltage;
    the voltage comparison control circuit is configured to compare the output voltage with the reference voltage and output a control signal that is received by the PWM control circuit if the output voltage and the reference voltage are different; and
    the PWM control circuit is configured to regulate the output voltage from the power conversion circuit and the transformer to achieve a power supply that is flicker-free with low noise and low ripple and no limitation on load power.

2. The voltage-regulating phase-cut dimmable power supply according to claim 1, further comprising a power factor correction (PFC) control circuit and a PFC circuit, wherein the PFC circuit is electrically connected to the PFC control circuit, an output end of the rectifier circuit and an input end of the power conversion circuit, respectively.

* * * * *